United States Patent [19]

Dietz et al.

[11] Patent Number: 4,515,049
[45] Date of Patent: May 7, 1985

[54] QUICK-CHANGE TOOL HOLDER FOR LATHES

[75] Inventors: Peter Dietz, Büttelborn; Norbert W. Müller, Frankfurt; Horst F. M. Kroh, Langen, all of Fed. Rep. of Germany

[73] Assignee: Pittler Machinenfabrik AG, Fed. Rep. of Germany

[21] Appl. No.: 314,228

[22] Filed: Oct. 23, 1981

[30] Foreign Application Priority Data

Nov. 3, 1980 [DE] Fed. Rep. of Germany ... 8029160[U]

[51] Int. Cl.³ ............... B23B 29/00; B23B 3/06; B23Q 3/00
[52] U.S. Cl. ............... 82/36 R; 82/34 A; 269/97
[58] Field of Search ............ 82/36 B, 36 R, 34 A, 82/35, 34; 269/97, 99, 235; 279/1 TE; 74/529, 50, 570, 571 L, 571 M, 390

[56] References Cited

U.S. PATENT DOCUMENTS

| | | | |
|---|---|---|---|
| 2,023,869 | 12/1935 | Buell | 269/97 |
| 2,763,176 | 9/1956 | Chartier et al. | 82/36 R |
| 3,107,562 | 10/1963 | Miller | 82/36 R |
| 3,163,062 | 12/1964 | Schultz | 82/36 R |
| 3,232,153 | 2/1966 | Davis | 82/36 R |
| 3,503,287 | 3/1970 | Zeller et al. | 82/36 R |
| 3,545,319 | 12/1970 | Anderson et al. | 82/36 R |
| 3,822,619 | 7/1974 | Willem | 82/36 R |
| 4,043,229 | 8/1977 | Ortlich | 82/36 R |
| 4,221,142 | 9/1980 | Minder | 82/36 R |

Primary Examiner—Paul A. Bell
Assistant Examiner—Paul M. Heyrana, Sr.
Attorney, Agent, or Firm—Michael, Best & Friedrich

[57] ABSTRACT

A quick-change tool holder for a lathe including a tool carriage, the holder comprising a support member adapted to be mounted on the tool carriage, a tool holder member adjacent the support member and including a first bore extending generally perpendicularly from the support member, and a second bore extending at about a right angle from the first bore. The holder also includes a mechanism for attaching the tool holder member to the support member, which mechanism comprises a mounting member which is detachably mounted on the support member, which is received in the first bore in the tool holder member, and which includes a bore. The attaching mechanism also includes a bolt which is received in the second bore, and which is movable between an operating position, wherein the bolt penetrates the bore in the mounting member and secures the mounting member in the first bore in the tool holder member, and a nonoperating position, wherein the bolt is withdrawn from the bore in the mounting member so that the tool holder member is detached from the mounting member.

13 Claims, 5 Drawing Figures

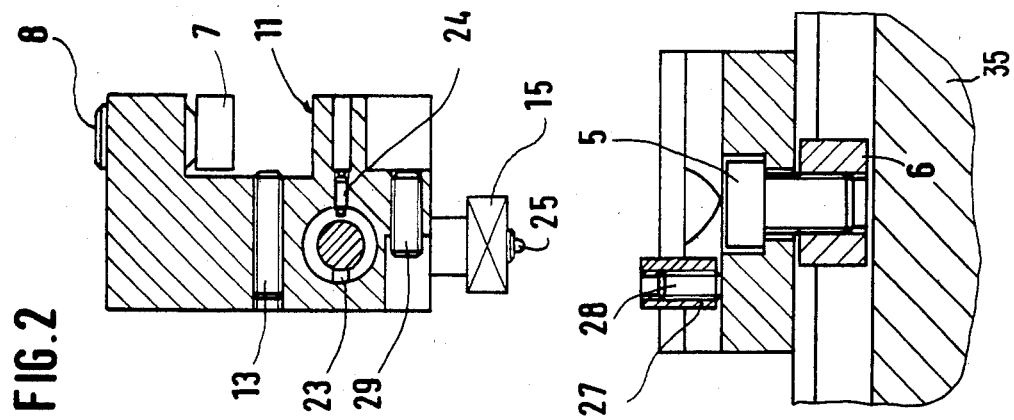
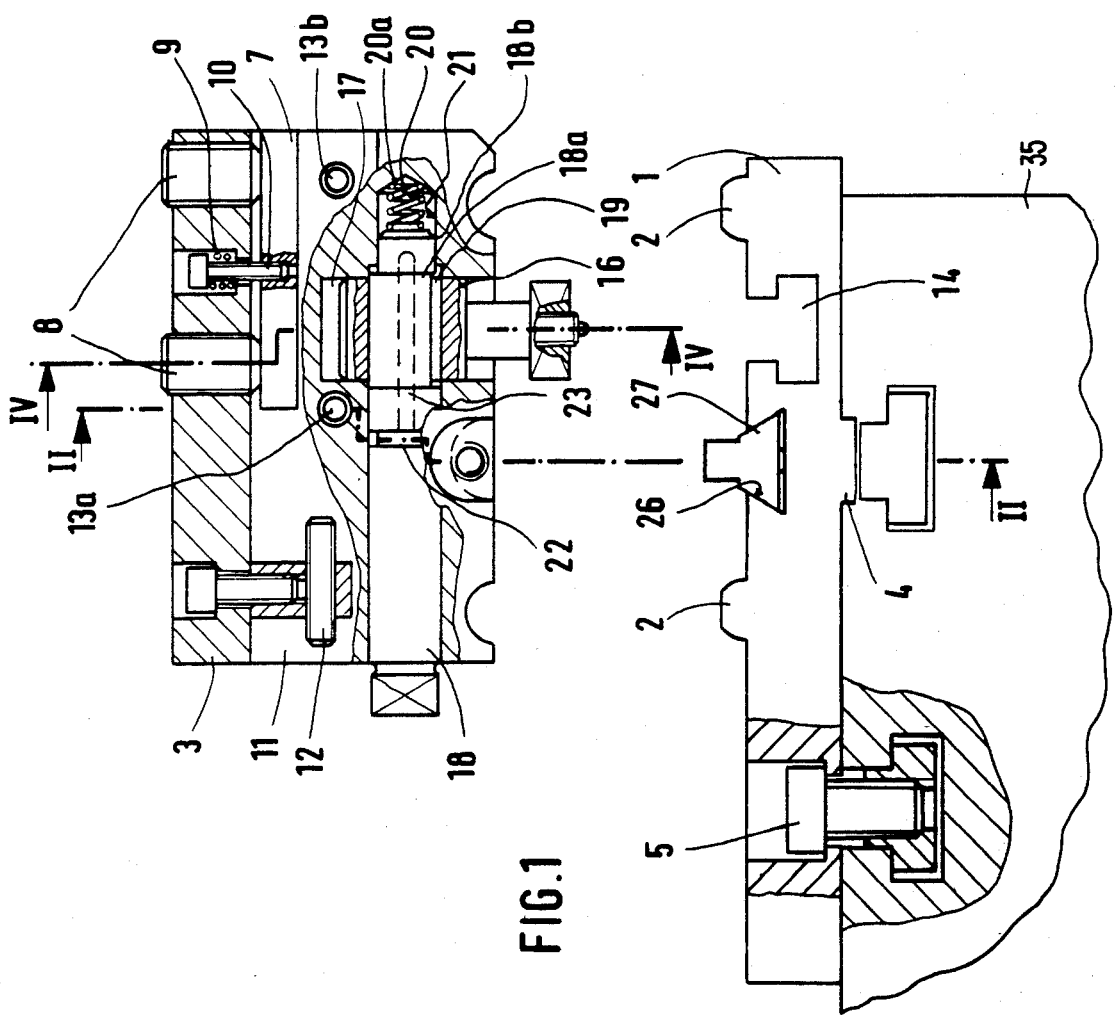

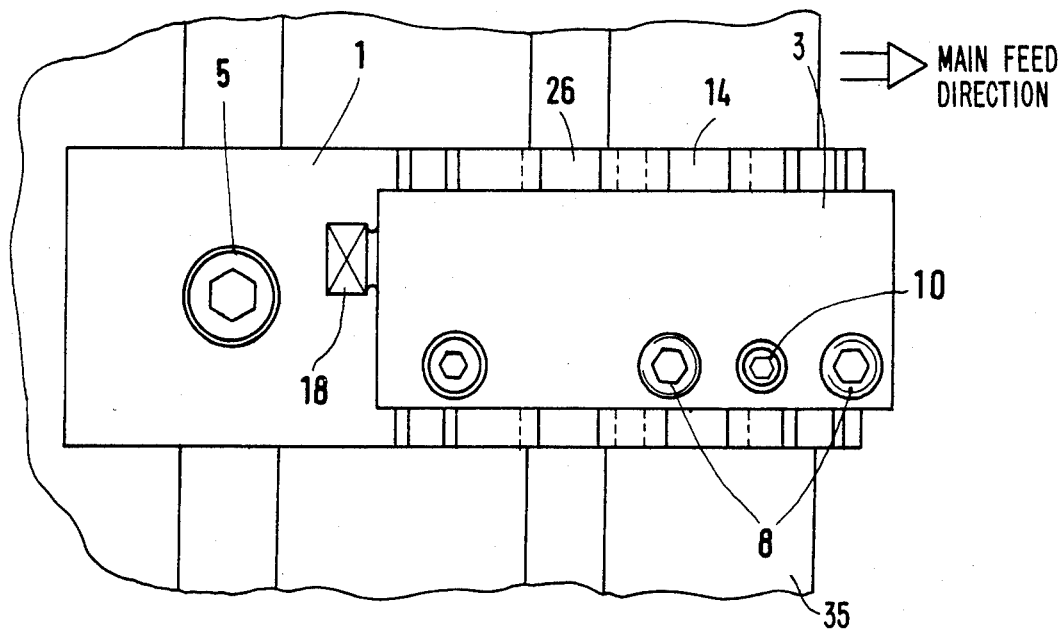
FIG. 3
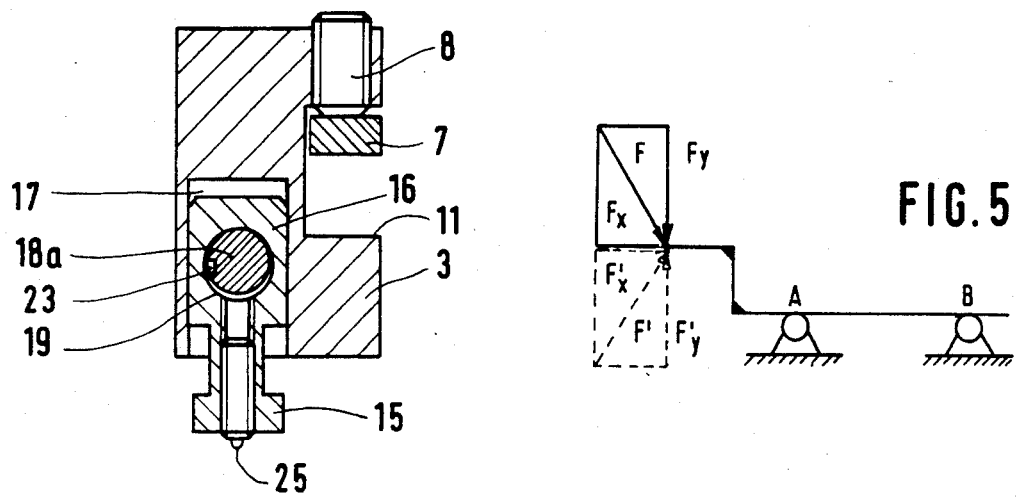
FIG. 4
FIG. 5

QUICK-CHANGE TOOL HOLDER FOR LATHES

The innovation concerns a quick-change tool holder for lathes, which consists of a basic holder and a change insert that receives the tool; the holder and insert can be positioned relative to one another on prismatic or round guides by placement against an adjustable fence, and they can be chucked vertically to the guide plane by means of a clamping device; the control elements of the clamping device are located in the change holder.

A tool holder of this type is known from DE-OS No. 27 45 402, where, depending on the application for a cutting tool (FIGS. 1-3) or a planing tool (FIGS. 4-6) only one, respectively two adjustment directions are provided; in the latter case the required adjusting and clamping devices are constructed identically, i.e. they exist two-fold. This means that, instead of only one change insert, two exchangeable holding components with identical guides and clamping devices are likewise necessary for the tool. This results in considerable costs and requires double warehousing by the user.

For this reason one dispenses, for example in the case of tools for multi-spindle lathes, with double adjustability and provides only one adjusting plane, which is designed in such a way that the turning height can be adjusted by means of a stop screw (Spur, MEHRSPIN-DEL-DREHAUTOMATEN, Carl Hanser Verlag, Munich, page 173). This traditional design of the guide plane has the disadvantage that an adjustment of the work piece dimensions is not possible. The quick-change tool holder known from DE-OS No. 27 45 402 also has a screw-operated clamping device, which is located in the change insert (FIGS. 2,3,7,8,9). Opposite threads in axially separated areas are located at an axially stationary operating screw; these threads are geared with non-turnable gripping jaws in the change holder, which are moved toward or away from one another as the screw is operated. The clamping sides of these clamping jaws have wedge-shaped areas, which grasp the accordingly designed wedge areas of a groove stone, which is movably located in a T-groove of the basic holder; in this manner, the wedge areas can change the chucking of the change insert relative to the basic holder. By correspondingly wide setback of the gripping jaws this construction makes it possible to remove the change insert not only in the direction of the guides, but also vertical to the guide plane, which is a considerable advantage in view of the cramped space conditions of, for example, multi-spindle automatic lathes. However, this design of the clamping device is very costly, and the function of the clamping device is not assured when the groove stone is adjustable in the basic holder, since the groove stone is no longer visible when the change holder is installed and, consequently, the exact gearing of the clamping jaws with the stone can no longer be checked. This requires the use of very long, and thus expensive, groove stones, or instead one must use a long web with slanting gripping surfaces, which has to be in one-piece construction with the basic holder.

A further disadvantage of the known clamping device is the fact that the draw spindle in the change insert is transverse to the longitudinal axis of the holder. If it becomes necessary to place several change inserts close to each other on a plate-type basic holder, the access to the claping device of most change inserts is blocked, and the adjoining change inserts must first be removed before the clamping of an inside insert can be loosened.

Presumably in order to remove this disadvantage, DE-OS No. 27 45 407 suggests (FIG. 6) to operate the clamping from above: A screw supported against the upper side of the change insert is geared with a chucking element and displaces the latter, which grasps the groove stone via a dove-tailed recess at the lower end, the groove stone being located in the basic holder and equipped with the corresponding wedge areas. This solution has the disadvantage that, after the screw has been loosened, the change insert must also be moved in the direction of the guide plane in order to separate the chucking element from the groove stone, or that, after loosening of the draw spindle or of a radially slotted washer, the change insert must be lifted from the chucking element, which makes the replacing of the element very laborious.

In addition, both design forms of the clamping device in DE-OS No. 27 45 407 have the disadvantage that, when the change insert is placed on the basic holder, the exact gearing between the chucking element and the groove stone cannot be visually checked, nor can it be assured by using a long groove stone, since a long groove stone requires a correspondingly long movement of the change holder before removal. Furthermore, it is a disadvantage that the displacement direction away from the spindle is blocked by the fence (stop), so that when removing the change insert one must always move it toward the spindle.

This innovation has the following purpose: To take a quick-change tool holder of the above-mentioned type with only one guide plane, and having one or more prismatic or round guides, and to design the latter in such a way that sufficient adjustability of the tool is made possible for all applications. In addition, the clamping device is to be improved in such a way that the disadvantages of known tool holders are avoided, and that immediate loosening in the direction of the guides as well as vertically to the guide plane is possible in one short operation.

The invention achieves this purpose in that the guides are located parallel to the chucking area of the basic holder on the tool carriage and at a right angle to the main feed direction, in that the clamping device has eccentric bolt which protrudes through a boring in a face plate, and in that the eccentric bolt is alternately used turnably as well as axially movable in the main feed direction and can be moved from an operating position to a non-operating position, in which latter position it releases the face plate, which is movable in the basic holder within a T-groove by means of a groove stone, so that the change holder is removable vertical to the guide plane.

The invention is based on the fact that a quick-change tool holding system for a lathe actually requires three adjustment directions, i.e. direction x for adjusting the diameter, direction y for adjusting the height (turning height), and direction z for adjusting the length. If all four direction adjustment devices are arranged in the tool holder, which is technically quite feasible—there are known solutions with four-fold adjustment, even including a swivel movement—the resulting costs are so high that the use of these tool holders is economically justified only in special, exceptional cases. In any case, these solutions are uneconomical for a quick-change tool holding system which has to be offered as standard equipment for a lathe. Therefore, the invention is based on the consideration that it is more sensible to place one of these adjustment possibilities into the lathe proper, namely the positioning of the basic holder in the main feed direction, for example by using limit stops for the feed carriage, the construction of a carriage with an adjustable upper part, or the arrangement of adjustable stops for the basic holder on the carriage. As a consequence, only one adjustment possibility transverse to the feed direction is sufficient in the tool holder, while still insuring an adjustment in two directions (direction x and z). The resulting economic advantage of using the machine-contained adjustment possibility for all tool holders is evident.

A further advantage is that the quick-change tool holder of the invention is applicable not only in mechanically or hydraulically operated lathes—especially multi-spindle lathes, automatic—but, as a result of its economic advantages, can also be used with numerically controlled machines. This offers general applicability, which in turn further underlines the economic importance of the invention.

In addition, it must be stressed that, by limiting the device to only one adjustment direction, the placement of the guide direction tranverse to the feed direction and the special design of the clamping device result in several simultaneous advantages:

the change inserts can be positioned close to each other;

the eccentric bolt for loosening and clamping is always accessible;

independent of other inserts, each individual insert can be simply removed vertical to the guide plane, and it can be re-installed by the same route;

faultless clamping is always guaranteed, since the eccentric bolt penetrates the face plate and thus assures a clear space relationship of these parts to one another independent of the movability of the face plate.

Compared with the state of the art (DE-AS No. 16 27 007) with the eccentric bolt being placed in the basic holder, the additional advantage arises that the point of impact of the clamping force is exactly defined due to the fixed position of the eccentric bolt in the change insert, while in the state of the art it changes as the change insert is adjusted. Consequently, the tool holder of the invention permits considerably longer adjustment paths.

In a quick-change tool holder as per the invention, with two prismatic or round guides spaced in the direction of the main feed, a first advantageous construction is attained in that the T-groove with the groove stone of the face plate is positioned asymmetrically between the two guides in such a way that it runs closer to that guide which is nearer the tool cutting edge. This design makes it possible to use only one such clamping device and yet to safely receive the tilting moments resulting from the impact of the cutting tool on the work piece, and to transfer these tilting moments to the basic holder.

According to another design characteristic of the invention, the eccentric bolt is spring-loaded in the axial direction in such a way that it is automatically moved in the axial direction after the loosening of the eccentric clamping. This makes it possible to visually check the condition of the clamping device from the outside.

Further, a special design feature of the clamping device of the invention is characterized by the fact that the eccentric bolt is equipped with an axial groove and with a radial groove, which connects to the one end of the axial groove; a guiding device, such as a screw or a pin, located in the change insert, gears with these grooves. In this way it is prevented that the eccentric bold gets lost.

A construction example of the quick-change tool holder according to the invention is explained in greater detail with the aid of the drawing below:

FIG. 1: shown separately, and partially as a cut, are side views of the basic holder and of the change insert of the quick-change tool holder, FIG. 2: a cut through the basic holder and the change insert along line II—II in FIG. I, FIG. 3: a top view of the installed quick-change tool holder, FIG. 4: a cut through the change insert along line IV—IV in FIG. 1, and FIG. 5: a drawing of the force moment conditions when machining front head and overhead.

The drawing shows a basic holder 1 with two round guides 2 and a change insert 3 installable thereon. The basic holder 1 is constructed as a plate and has a ledge 4, by means of which it can be inserted into a groove of a carriage 35 of a lathe and fastened with screws 5 and groove stones 6.

The tool (not shown), i.e. a lathe cutting tool, is chucked in the traditional manner in the change insert 3 via a clamping plate 7 with draw spindles 8. The clamping plate 7 is held in the change insert 3 via a spring-loaded screw 10 in such a way, that it always touches the draw spindles 8 and thus makes possible the easy changing of the tool. The position of the tool in the tool channel 11 can be adjusted by means of set screws 12 and 13 (13a, 13b).

A groove stone 15 is movably placed in a groove 14 of the basic holder 1, which groove is T-shaped or dove-tailed. This groove stone 15 has a cylindrical extension 16, with which it protrudes into a boring 17 of the change insert 3, thus forming a static part. An eccentric bolt 18 is located in the change insert 3 parallel to the tool channel 11; the eccentric portion 18a of the eccentric bolt 18 penetrates a boring 19 in the extension 16 of the groove stone 15 and rests in the change insert 3 with a cylindrical end piece 18b having a smaller diameter.

One face end of a pressure spring 20 engages the eccentric bolt 18; the other face end 20a of the spring 20 is suitably attached, for example by gluing, in the boring 21 which receives end portion 18b of the eccentric bolt 18. The eccentric bolt 18 has a circumferential groove 22 and an axial groove 23, which joins the circumferential groove 22, runs through the eccentric portion 18a and is closed at its face at the end of 18a. When the eccentric bolt is in its operating position, a screw 24 located in the change insert engages the circumferential groove 22, so that in this position the eccentric bolt 18 can be moved only in rotation, but not axially. By the rotation the change insert 3 is clamped with the base holder 1, or the clamping is loosened. If, during loosening, the eccentric bolt 18 is turned so far, that the screw 24 moves in front of the axial groove 23, the effect of a spring 18 automatically moves the eccentric bolt 18 into a position where it protrudes farther from the change insert. Thus, when loosened, the eccentric bolt 18 always maintains a position which can be seen from the outside and which indicates the loosened position to the operator. The groove 23 is of such length that the extension 16 of the groove stone is released when the eccentric bolt 18 has been pulled out into the extreme position. In this position, the change insert 3 can be removed vertically to the round guides 2 from the base holder 1. In order to prevent the groove stone 15 from getting lost, a spring-loaded clamping bolt 25 is placed in its base area in the traditional manner, which keeps the groove stone in the T-groove by means of friction.

The basic holder 1 has a further groove 26 transverse to the feed direction, which is preferably dove-tail shaped, in which groove 26 a stop 27 is clamped fast by means of a threaded pin 28. The change insert 3 is adjustable against this stop by means of a set screw 29.

FIG. 5 shows the stress conditions under the effect of the cutting forces F, which are divided into the components Fx and Fy. The forces for overhead machining are shown shaded and marked by apostrophe. If, for the normal instance of front head machining, one forms the moments around the bearing point A, which corresponds to the round guide at the spindle side, one can see that the effective directions of the forces Fx and FY are opposite to one another and consequently cause a relatively small bearing force at the bearing point B. On the other hand, if one observes the moments of the forces F'x and F'y around point B in the case of overhead machining, the result for the bearing forces in A is that both force effects are in the same direction and consequently are added. This shows that bearing point A must receive a greater clamping force than B. Based on this consideration the receiver groove 14 for the groove stone 15 is not placed centrally between the round guides, but closer in the direction of the point of cutting, as this is shown in FIGS. 1 and 3.

We claim:

1. A quick change tool holder for a lathe including a tool carriage, said holder comprising a support member adapted to be mounted on the tool carriage, a tool holder member adjacent said support member and including a first bore extending generally perpendicularly from said support member, and a second bore extending at about a right angle from said first bore, and means for attaching said tool holder member to said support member, said attaching means comprising a mounting member which is mounted on said support member, which is received in said first bore in said tool holder member, and which includes a bore, and a bolt which is received in said second bore and which is movable between an operating position wherein said bolt penetrates said bore in said mounting member and secures said mounting member in said first bore in said tool holder member, and a nonoperating position wherein said bolt is withdrawn from said bore in said mounting member so that said tool holder member is detached from said mounting member.

2. A quick change tool holder in accordance with claim 1 wherein said support member further includes guide means positioned to extend at a right angle to the main feed direction of the tool carriage when said support member is mounted on the tool carriage, an adjustable stop, and a groove parallel to said guide means, and wherein said tool holder member is positioned against said adjustable stop to prevent movement along said guide means, and positioned against said guide means to prevent turning of said tool holder member relative to said support member, and wherein said mounting member is mounted on said support member by said mounting member including a groove stone portion releasably received in said groove in said support member.

3. A quick change tool holder in accordance with claim 2 wherein said tool holder includes a forward edge in the main feed direction of the tool carriage, and wherein said guide means comprises a first guide adjacent said forward edge, a second guide spaced back from said first guide, and wherein said groove is between said first guide and said second guide and nearer said first guide than said second guide.

4. A quick change tool holder in accordance with claim 2 and further including means for adjusting the position of said tool holder member relative to said adjustable stop when said tool holder member is detached from said support member.

5. A quick change tool holder in accordance with claim 1 wherein said bolt includes an eccentric portion which penetrates said bore in said mounting member when said bolt is in said operating position, and wherein said eccentric portion, in response to rotation of said bolt, is radially movable between a first position, wherein said mounting member is retracted into said tool holder member, thereby clamping said tool holder member against said support member, and a second position, wherein said mounting member is extended from said tool holder member, thereby unclamping said tool holder member from said support member.

6. A quick change tool holder in accordance with claim 5 wherein said attaching means further includes means for releasably securing said bolt in said operating position in response to rotation of said bolt.

7. A quick change tool holder in accordance with claim 6 wherein said attaching means further includes means for moving said bolt from said operating position to said nonoperating position in response to rotation of said bolt.

8. A quick change tool holder in accordance with claim 1 wherein said support member is adapted to be mounted on the tool carriage so that said second bore extends in the main feed direction of the tool carriage.

9. A quick change tool holder for a lathe including a tool carriage, said holder comprising a support member adapted to be mounted on the tool carriage, a tool holder member including a first bore extending generally perpendicularly from said support member, and a second bore extending at about a right angle from said first bore, and means for attaching said tool holder member to said support member, said attaching means comprising a mounting member which is detachably mounted on said support member, which is received in said first bore in said tool holder member, and which includes a bore, a bolt which is received in said second bore, which includes an eccentric portion, and which is axially movable between an operating position, wherein said eccentric portion penetrates said bore in said mounting member and secures said mounting member in said first bore in said tool holder member, and a nonoperating position, wherein said bolt is withdrawn from said bore in said mounting member so that said tool holder member is detached from said mounting member, and said eccentric portion, in response to rotation of said bolt, is radially movable between a first position, wherein said mounting member is retracted into said tool holder member, thereby clamping said tool holder member against said support member, and a second position, wherein said mounting member is extended from said tool holder member, thereby unclamping said tool holder member from said support member, and means for releasably securing said bolt in said operating position in response to rotation of said bolt, said releasably securing means comprising said bolt further including a circumferential groove, and an axial groove in communication at one end thereof with said circumferential groove, and a member in said tool holder member which projects into said second bore and which is receivable in said axial groove and said circumferential groove.

10. A quick change tool holder in accordance with claim 9 wherein said axial groove is closed at the other end thereof opposite from said circumferential groove.

11. A quick change tool holder for a lathe including a tool carriage, said holder comprising a support member adapted to be mounted on the tool carriage, a tool holder member including a first bore extending generally perpendicularly from said support member, and a second bore extending at about a right angle from said first bore, and means for attaching said tool holder member to said support member, said attaching means comprising a mounting member which is detachably mounted on said support member, which is received in said first bore in said tool holder member, and which includes a bore, a bolt which includes an end, which is received in said second bore, which includes an eccentric portion, and which is axially movable between an operating position, wherein said eccentric portion penetrates said bore in said mounting member and secures said mounting member in said first bore in said tool holder member, and a nonoperating position, wherein said bolt is withdrawn from said bore in said mounting member so that said tool holder member is detached from said mounting member, and said eccentric portion, in response to rotation of said bolt, is radially movable between a first position, wherein said mounting member is retracted into said tool holder member, thereby clamping said tool holder member against said support member, and a second position, wherein said mounting member is extended from said tool holder member, thereby unclamping said tool holder member from said support member, means for releasably securing said bolt in said operating position in response to rotation of said bolt, and means for moving said bolt from said operating position to said nonoperating position in response to rotation of said bolt, said moving means comprising a spring in said second bore of said tool holder member and located between said end of said bolt and said tool holder member.

12. A quick change tool holder in accordance with claim 11 wherein said bolt includes another end which projects from said tool holder member and permits manual axial movement and manual rotation of said bolt.

13. A quick change tool holder for a lathe including a tool carriage, said holder comprising a support member adapted to be mounted on the tool carriage and including guide means positioned to extend at a right angle to the main feed direction of the tool carriage when said support member is mounted on the tool carriage, and an adjustable stop, a tool holder member positioned against said adjustable stop to prevent movement along said guide means, and positioned against said guide means to prevent turning of said tool holder member relative to said support member, said tool holder member including a first bore extending generally perpendicularly from said support member, and a second bore extending at about a right angle from said first bore, means for adjusting the position of said tool holder member relative to said adjustable stop when said tool holder member is detached from said support member, and means for attaching said tool holder member to said support member, said attaching means comprising a mounting member which is mounted on said support member, which is received in said first bore in said tool holder member, and which includes a bore, a bolt which is received in said second bore, which includes an eccentric portion, and which is axially movable between an operating position, wherein said eccentric portion penetrates said bore in said mounting member and secures said mounting member in said first bore in said tool holder member, and a nonoperating position, which said bolt is withdrawn from said bore in said mounting member so that said tool holder member is detached from said mounting member, and said eccentric portion, in response to rotation of said bolt, is radially movable between a first position, wherein said mounting member is retracted into said tool holder member, thereby clamping said tool holder member against said support member, and a second position, wherein said mounting member is extended from said tool holder member, thereby unclamping said tool holder member from said support member, means for releasably securing said bolt in said operating position in response to rotation of said bolt, and means for moving said bolt from said operating position to said nonoperating position in response to rotation of said bolt.

* * * * *